United States Patent Office 2,859,197
Patented Nov. 4, 1958

2,859,197

USE OF DIMETHYL AND DIETHYL ADIPATES IN VINYLIDENE RESINS

Robert J. Reid, Canal Fulton, William Mayo Smith, Jr., Cuyahoga Falls, and Byron H. Werner, Akron, Ohio, assignors to The Firestone Tire & Rubber Company, Akron, Ohio, a corporation of Ohio No Drawing. Application February 23, 1954
Serial No. 412,075

8 Claims. (Cl. 260—31.8)

This invention relates to the use of dimethyl and diethyl adipates as processing aids in the hot melt extrusion of crystalline polymers and copolymers of vinylidene chloride.

These crystalline polymeric resins have been known for some time. They have been used to a substantial extent in the manufacture of films and filaments for various purposes, but the extrusion has presented various difficulties. The high temperatures necessary for processing are very close to the decomposition temperature of the composition. Therefore, it is essential that some additive be used which will lower the processing temperature below the critical range without having any undesirable effect on the products obtained.

Such resins are characterized by crystalline behavior, i. e., they fuse sharply to form relatively fluid melts. On quenching and orienting, the extruded filaments and films are crystalline in character. A syndrome of this crystalline habit is the recalcitrance of these resins to compounding: The macromolecules of these resins prefer contact with each other and tend to reject any foreign substances such as plasticizers and the like. In the random structure obtained without orientation any added ingredient of limited compatibility, such as the processing aids of this invention, is retained in larger percentages than is possible in the stretched or oriented products. On stretching, the tendency toward exudation or spewing is considerably increased. In orienting films and filaments of vinylidene resins they are stretched to several times their original length, and ordinarily until there is a sharp rise in the modulus. It is difficult to provide suitable processing aids which do not exhibit an undesirable spew or bloom on the surface of the oriented products and which in addition possess good heat and light stability or which at least are not detrimental to such stability.

Thus, the problem of providing processing aids for these crystalline resins is complicated not only by the fact that they tend to reject and spew the majority of conventional plasticizers, but, because the resins are extruded as hot melts at temperatures in the neighborhood of, for example, 170° C., many conventional resin-compounding ingredients tend to decompose or react with other compounding ingredients which are present when the resins are maintained in a molten state immediately prior to and during extrusion.

The crystalline resins to which the processing aids of this invention are added include both homopolymers of vinylidene chloride and copolymers thereof with not more than substantially 15 percent of other ethylenically unsaturated compounds copolymerizable therewith. The copolymers contain at least substantially 85 percent of vinylidene chloride. Suitable comonomers for the copolymerization include, for example, vinyl chloride, vinyl fluoride, vinyl acetate, styrene, acrylic and methacrylic esters such as methyl methacrylate, ethyl methacrylate, and the like, acrylonitrile, vinyl-type ethers and ketones such as methylvinyl ether, methylvinyl ketone and related compounds such as methylisopropenyl ketone and the like. For a more complete list of compounds known to copolymerize with vinylidene chloride to produce resins which can be plasticized as herein described see Krczil, "Kurzes Handbuch der Polymerisationstechnik," vol. II, "Mehrstoffpolymerization," Edwards Bros., Inc., p. 739, the items indented under "vinylidene chlorid."

The processing aids of this invention are the dimethyl and diethyl adipates. They have excellent light stability and good heat stability as well as good spew resistance. They are non-toxic, non-allergic, and relatively odorless. In addition, they do not appreciably increase the tendency of oriented films or filaments to shrink when exposed to elevated temperatures.

Compounding and testing

With regard to the use of the processing aids, a small amount, in the range of 3 to 8 percent or up to 10 percent based on the weight of the resin will generally be found most satisfactory. Less than 3 percent may be used in admixture with another processing aid. Such percentages will be stably retained within the resin in the finished oriented article. In no case will more than about 10 percent of the processing aid be employed in a vinylidene resin because such larger amounts are incompatible and exude to the surface of oriented products produced from vinylidene polymeric resins containing 85 percent or more of vinylidene chloride.

The adipates of this invention can be employed with the epoxy heat stabilizers such as glycidyl-phenylether, the mono-, di-, tri-, tetra-, and penta-chlorinated derivatives of phenoxypropene oxide, polymeric phenoxy compounds prepared from various dihydroxy phenols and epichlorhydrin, etc. Likewise, they can be employed with the light stabilizers which are esters of salicylic acid such as phenyl salicylate, 4-tert-butylphenyl salicylate, 4-octyl phenyl salicylate, 2-methyl phenyl salicylate, 4-chloro phenyl salicylate, 3-methyl phenyl salicylate, 4-t-amyl phenyl salicylate, 4-nonyl phenyl salicylate, 2-octyl-4-methyl salicylate, 2-isopropyl salicylate, nonyl salicylate, ethylhexyl salicylate, n-butyl salicylate, etc.

The dimethyl and diethyl adipates impart desirable extrusion properties to the resins and are retained in the extruded, oriented products. They have no adverse effect on light or heat stability and many actually assist in their action.

Test data was compiled from compositions both with and without light and heat stabilizers according to the following formulation:

| | Parts by weight |
|---|---|
| Crystalline resinous copolymer of vinylidene chloride and vinyl chloride (85:15) | 100 |
| Glycidyl phenyl ether | 0 or 2 |
| 4-t-butyl phenyl salicylate | 0 or 2 |
| Processing aid | 8 |

The additives were ball milled with the resin, and samples tested for heat stability, light stability and spew according to the methods given below:

Heat stability

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was—

(1) Heat for three minutes with steam at 120 lbs./sq. in. and mold pressure of 1000 lbs./sq. in.;

(2) Water cool for two minutes under 1000 lbs./sq. in. mold pressure; and (3) Eject from the press.

The resultant cylindrical button (1.25 inches in diameter and .125–.188 inch in height) was then cut into sector-shaped specimens which were placed in a forced-draft oven at 180° C. Specimens were removed at intervals of 10, 20, and 30 minutes after placing in the oven, and the behavior of the specimens on the test as a whole was rated by the operator.

Light stability

One gram samples of the compositions to be tested were placed between Cellophane (regenerated cellulose) sheets and pressed in a flat platen laboratory press under a total of 1000 lbs. at a temperature of 180° C., yielding a plaque approximately 6 to 8 mils thick. The plaques were tested according to the method of ASTM test D620–45T under a sunlamp for 240 hours.

Plaques were also tested in a weatherometer for 100 hours and 200 hours. The weatherometer was a standard X–1–A machine, using a Corex D filter and operating without the sprays.

Spew rating

A plaque of the compounded resin was pressed between Cellophane (regenerated cellulose) sheets in a Carver press at 180° C., using approximately 1.5 grams of resin, 10 seconds preheat, and 15 seconds with the minimum pressure (pressure indicator just off zero). The plaque was quenched in cold water immediately and an approximately ⅜ inch wide strip was cut from the plaque, the cellophane removed, and the strip oriented to its limit.

The oriented strips were placed in glassine bags under mild pressure so that contact of the strips with the bag was assured. Any exudation of plasticizer could then be noted as an oily streak on the glassine. Tests were carried out at room temperature and at 50° C., the latter condition tending to accentuate any migration of plasticizer. In such a test, after 56 days at room temperature no spew was observed in samples containing the processing aids of this invention, whereas with dioctyl phthalate instead of an adipate, definite spew occurred after one day.

Test results

It was found that the use of dimethyl and diethyl adipates do not adversely affect the heat and light stability of the resin compositions. In fact, it was observed that the deletion of the glycidyl phenyl ether (used as a heat stabilizer) and/or the 4-t-butyl phenyl salicylate (used as a light stabilizer) was partially compensated for by the processing aid. Adipates having only one or two carbon atoms in each alkyl group were chosen as processing aids because these materials do not show adverse spew under the aforementioned conditions. The light and heat stability of these esters are entirely satisfactory. However, adipates higher than diethyl show a markedly increased tendency to spew, and above the levels mentioned cannot be acceptably used.

The resins referred to herein are homopolymers of vinylidene chloride and copolymers thereof with up to 15 percent of other monomer copolymerized therewith. Increasing the vinyl chloride content of a resin gives polymeric products in which plasticizers generally are more compatible. The comment herein relative to spew is to be considered in the light of the fact that homopolymers of vinylidene chloride are somewhat less compatible with the processing aids than copolymers containing as much as 15 percent of vinyl chloride or other monomer.

Extrusion

Tests were conducted using various processing aids with 4 to 8 parts by weight of the processing aid, together with 2 parts glycidyl phenyl ether and 2 parts phenyl salicylate as light and heat stabilizers. The extrusions were carried out in conventional screw-type machines, the molten polymer being forced through dies to form filaments which were then quenched by passage through a water bath and cold-drawn some 400 percent by passage over differential speed rolls.

With as little as four parts of dimethyl or diethyl adipate smooth filaments are produced readily in gauges from .006 inch to .015 inch without heat degradation. These filaments exhibit no exudation of adipate on storage and possess excellent light stability when exposed to Florida sunshine. They have good heat stability. Extrusions carried out with conventional plasticizers such as di-octylphthalate required at least 8 parts plasticizer to give desirable extrusion characteristics and such filaments on storage in all cases exuded the plasticizer.

The adipates of this invention lower the melt temperature of the resin, allowing extrusions to take place without decomposition. The extruded products are smooth and of uniform diameter, and are free of spew after orientation.

What we claim is:

1. In the process of extruding and orienting a crystalline polymeric resin selected from the group consisting of homopolymers of vinylidene chloride and copolymers thereof with up to 15 percent by weight of other ethylenically unsaturated monomer, the improvement which comprises extruding and orienting the molten resin while admixed with a dialkyl adipate, as a processing aid, the adipate being from the class consisting of the dimethyl and diethyl adipates, whereby a non-exuding extruded, oriented product is obtained, the amount of the adipate being substantial but not in excess of about 10 percent, said percentages referring to percentages by weight of the polymeric resin.

2. The process of claim 1 in which the dialkyl adipate is dimethyl adipate.

3. The process of claim in which the dialkyl adipate is diethyl adipate.

4. The process of claim 1 in which an epoxy heat stabilizer and a light stabilizer are used in the molten resin, the light stabilizer being an ester of salicylic acid.

5. A resin composition which includes a crystalline polymeric resin selected from the group consisting of homopolymers of vinylidene chloride and copolymers thereof with up to 15 percent by weight of other ethylenically unsaturated monomer, and as a processing aid a dialkyl adipate of the class consisting of dimethyl adipate and diethyl adipate, the amount of the adipate being substantial but not in excess of about 10 percent, said percentages referring to percentages by weight of the polymeric resin.

6. The resin composition of claim 5 in which the processing aid is dimethyl adipate.

7. The resin composition of claim 5 in which the processing aid is diethyl adipate.

8. The resin composition of claim 5 which contains an epoxy heat stabilizer and a light stabilizer which is an ester of salicylic acid.

References Cited in the file of this patent

UNITED STATES PATENTS

| 2,091,241 | Kvalnes | Aug. 24, 1937 |
| 2,477,610 | Irons | Aug. 2, 1949 |
| 2,484,483 | Berry | Oct. 11, 1949 |

UNITED STATES PATENT OFFICE
CERTIFICATION OF CORRECTION

Patent No. 2,859,197                                                    November 4, 1958

Robert J. Reid et al.

It is hereby certified that error appears in the above numbered patent requiring correction and that the said Letters Patent should read as corrected below.

Column 4, line 38, after "claim" insert -- 1 --.

Signed and sealed this 10th day of April 1962.

(SEAL)
Attest:

ERNEST W. SWIDER                                       DAVID L. LADD
Attesting Officer                                         Commissioner of Patents